A. BLOESINGER AND F. D. HOWE.
DRIVE BELT FOR PULLEYS.
APPLICATION FILED FEB. 1, 1918.
1,347,674.
Patented July 27, 1920.
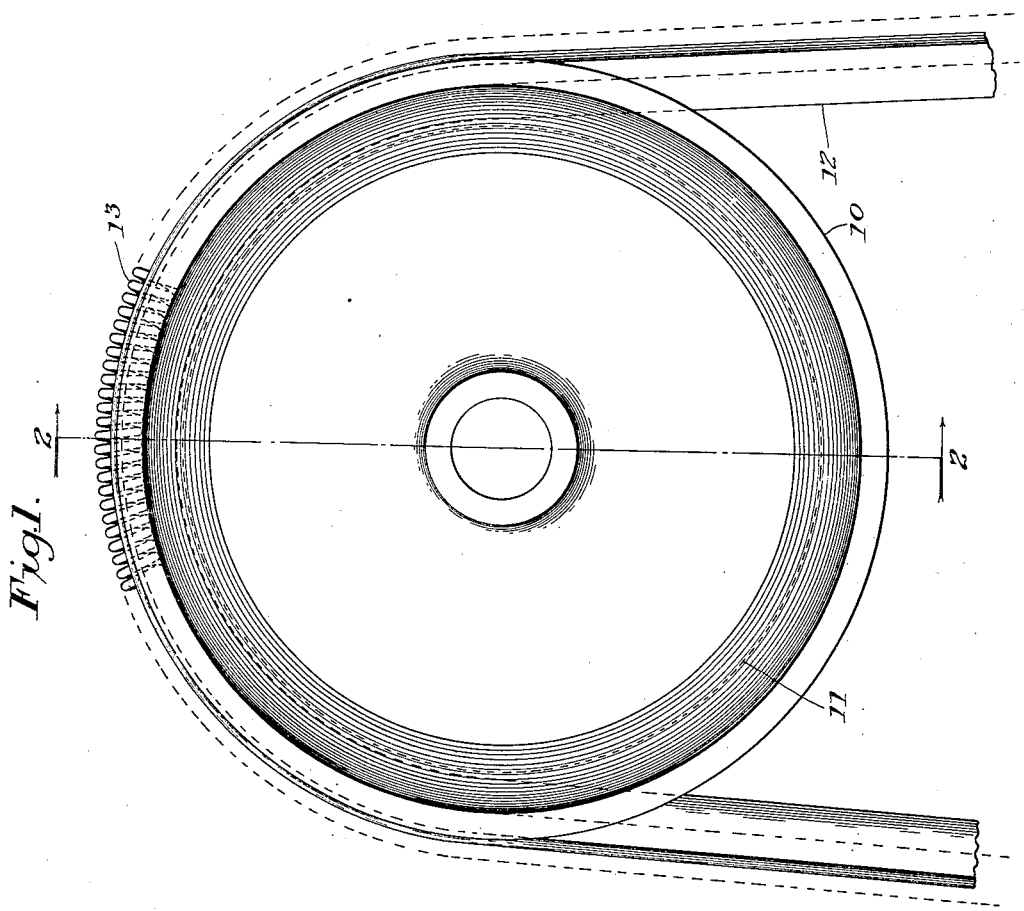
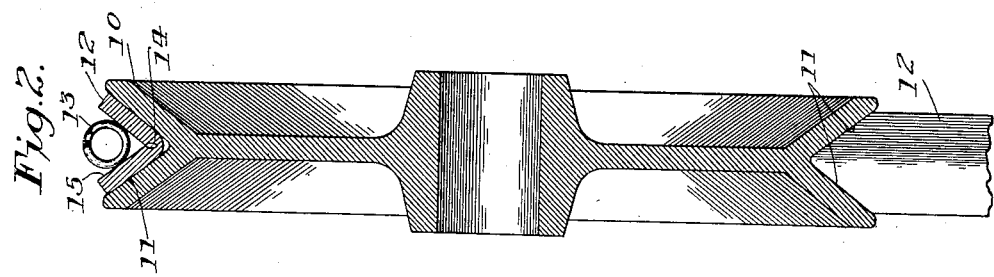
Inventors.
Frank D. Howe,
August Bloesinger,
by Chas. E. Lord
Atty.

UNITED STATES PATENT OFFICE.

AUGUST BLOESINGER, OF AKRON, AND FRANK D. HOWE, OF CUYAHOGA FALLS, OHIO, ASSIGNORS, BY MESNE ASSIGNMENTS, TO INTERNATIONAL HARVESTER COMPANY, A CORPORATION OF NEW JERSEY.

DRIVE-BELT FOR PULLEYS.

1,347,674.

Specification of Letters Patent.   Patented July 27, 1920.

Application filed February 1, 1918. Serial No. 214,994.

*To all whom it may concern:*

Be it known that we, AUGUST BLOESINGER and FRANK D. HOWE, citizens of the United States, and residents, respectively, of Akron, in the county of Summit and State of Ohio, and of Cuyahoga Falls, in the county of Summit and State of Ohio, have invented certain new and useful Improvements in Drive-Belts for Pulleys, of which the following is a full, clear, and exact specification.

Our invention relates to pulleys and driving belts therefor.

The object of this invention is to provide improved belt driving means for pulleys and to increase the driving power of said belt with respect to said pulley.

This consists primarily in a belt drive comprising two belts running on the same pulley, one engaging the face of the pulley and the other engaging the first mentioned belt to increase its frictional engagement with the pulley.

The invention is illustrated in the accompanying sheet of drawings in which—

Figure 1 is a front elevation of a pulley showing the main and auxiliary belts thereon;

Fig. 2 is a sectional view taken along line 2—2 of Fig. 1; and

Fig. 3 is a cross sectional view of the main belt in a flattened position.

The same reference characters designate like parts throughout the several views.

Our invention is shown comprising a pulley 10, having a grooved face 11, a driving belt 12 therefor and a tension spring 13 in engagement with the main driving belt to increase the frictional engagement of the belt with respect to the pulley.

In order that the friction engaging surfaces of the driving belt 12 shall conform to the surface of the pulley it is necessary that the belt also be grooved or folded. This is accomplished by providing the ordinary flat driving belt with a reduced central portion 14 (Fig. 3). This belt may then be folded at its reduced portion to conform to the driving surface of the grooved pulley, and in so folding the belt forms a groove 15, taking the form of a letter V.

There is a tendency with grooved belts of this kind for the belt to flatten and a large amount of its driving force is lost thereby. To overcome this objectionable feature we have provided a means in the form of the endless tension spring 13 which is placed in the groove 15 formed by folding the belt. The result is that the spring and grooved portions of the belt travel together with practically no endwise slippage and that the driving surface of the belt and pulley are kept in close engagement with each other, thereby preventing slipping of the belt on the pulley and increasing the driving power of the belt with respect to the pulley.

The spring also carries a portion of the load on the belt depending on the relative strength and tightness of the spring and V-belt members.

The operation of our invention is apparent from the description herein, and it is evident that there may be modifications in the form and arrangement herein disclosed, and it is our intention to cover all such modifications which do not depart from the spirit of our invention as covered by the claims.

What we claim as new is:

1. In a driving means for a pulley, a belt and a tension spring in engagement with said belt to cause the belt to conform to the pulley.

2. Driving means comprising a grooved pulley, a grooved driving belt therefor, and a tension spring inserted in said driving belt groove to increase the friction of said driving belt with respect to the pulley.

3. Driving means comprising a grooved pulley, a driving belt therefor, said belt having a longitudinally reduced portion therein on which the belt is folded to fit said grooved pulley, and a spiral spring member resting on the outer surface of the belt in the groove formed thereby.

4. In a driving means for a grooved pulley, a driving belt, said driving belt having a continuous longitudinally reduced portion therein, said reduced portion acting as a hinge when said belt is folded to fit said grooved pulley and a tension spring placed in contact with said belt to increase the friction thereof with respect to the pulley.

5. In a driving means for a V-shaped grooved pulley, a V-shaped belt, and a tension spring inserted in said V-shaped portion to increase the friction of said belt with respect to the pulley.

6. In a driving means for a V-shaped grooved pulley, a V-shaped belt having a continuous longitudinal reduced portion therein, said reduced portion acting as a hinge so that said belt may be folded to form a V-shaped belt and a tension spring placed in said V-shaped portion to increase the friction of said belt with respect to the pulley.

7. A driving belt including a member having a longitudinal reduced portion along which said member is bent and means lying within said bend to increase the frictional engagement of said member with the surface of a pulley.

8. A driving means for grooved pulleys, comprising a V-shaped belt adapted to engage a grooved pulley and open at its outer side, and resilient tension means within the open V of the belt and adapted to increase the friction between the belt and pulley.

9. A driving means for a grooved pulley comprising a belt adapted to engage in the groove of a pulley, and elastic tension means engaging said belt to conform the belt to the pulley groove and thereby increase the friction between the belt and pulley.

10. A driving means for a grooved pulley comprising a V-shaped belt adapted to engage a grooved pulley and to transmit power, tension means lying in the open V of the belt and adapted to conform the belt to the pulley to increase the frictional resistance between the belt and pulley and correspondingly increase the power transmitted by the belt.

In testimony whereof we affix our signatures.

AUGUST BLOESINGER.
FRANK D. HOWE.